Figure 1:
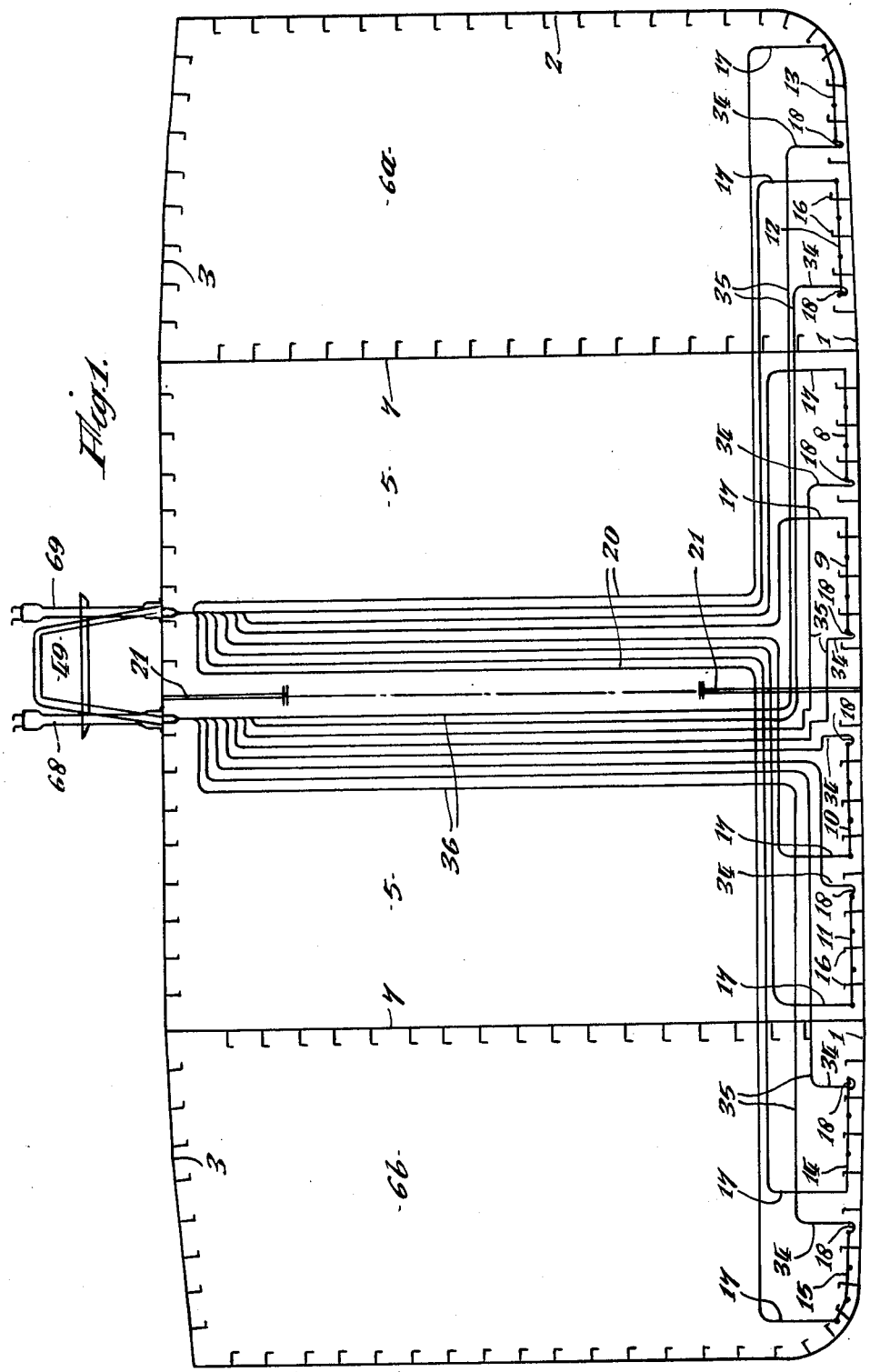

Sept. 14, 1965 T. P. W. MATTHEWS 3,205,848
HEATING APPARATUS FOR LIQUID CARGO TANKS OF SHIPS
Filed Nov. 8, 1962 6 Sheets-Sheet 1

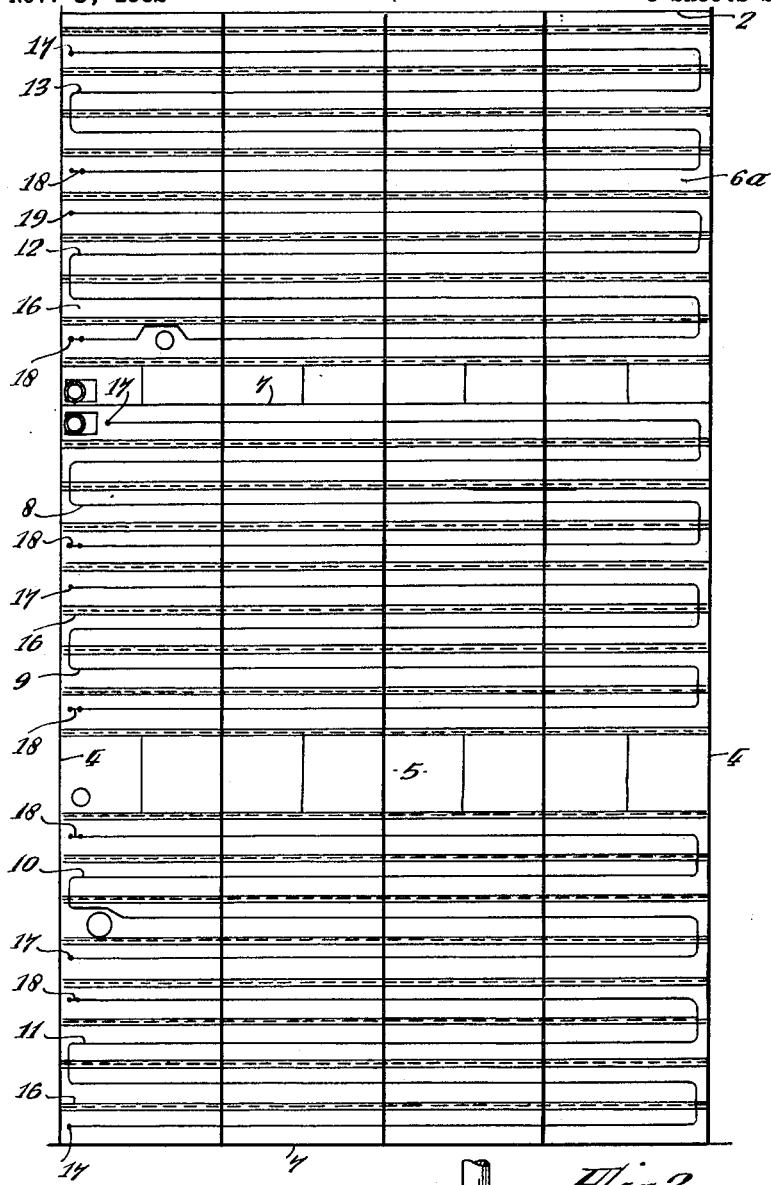
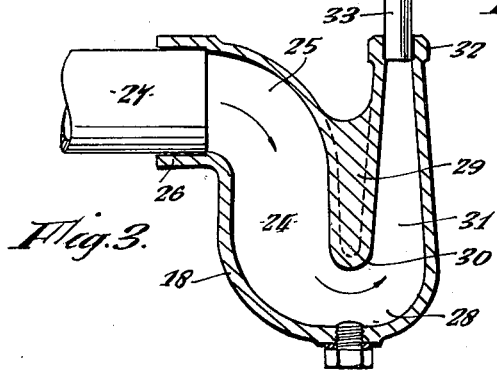

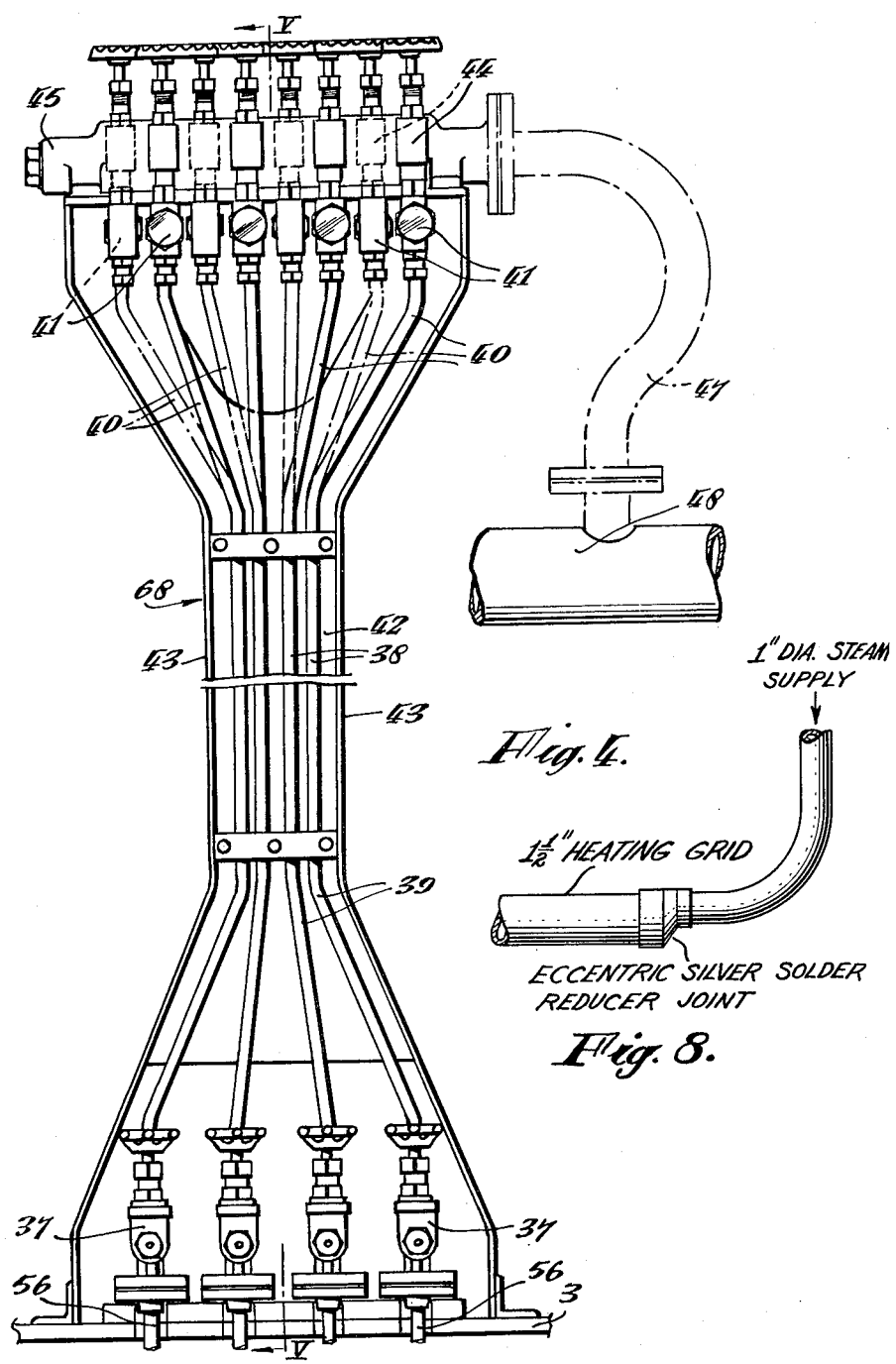

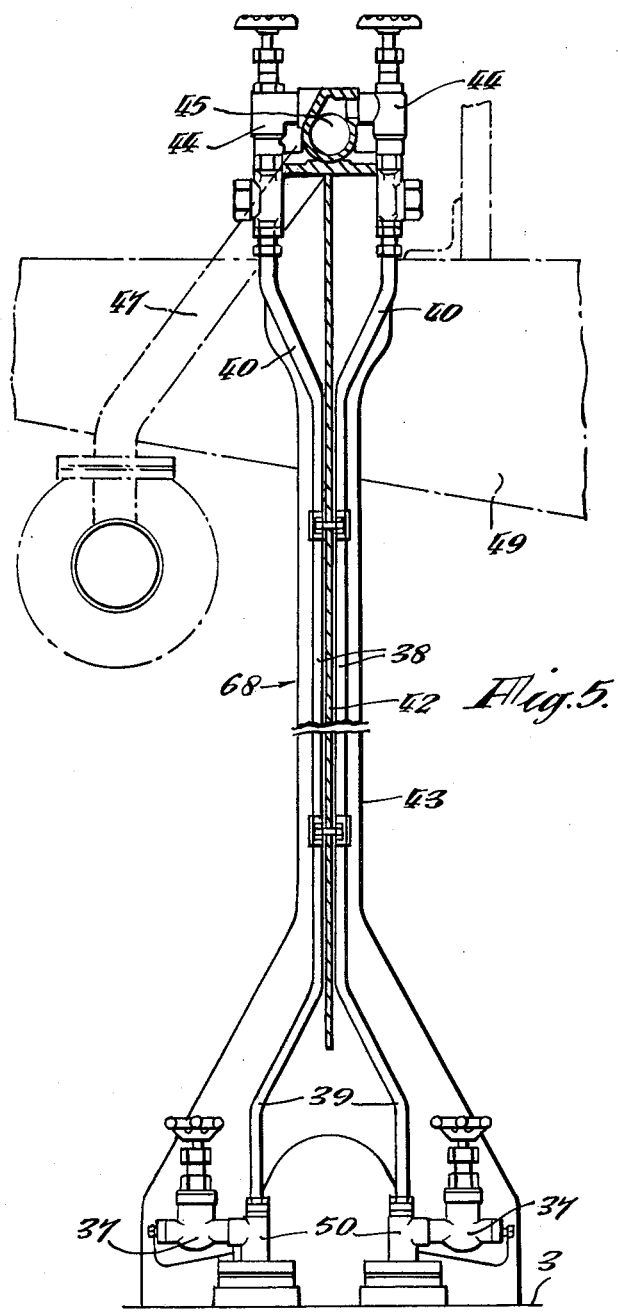

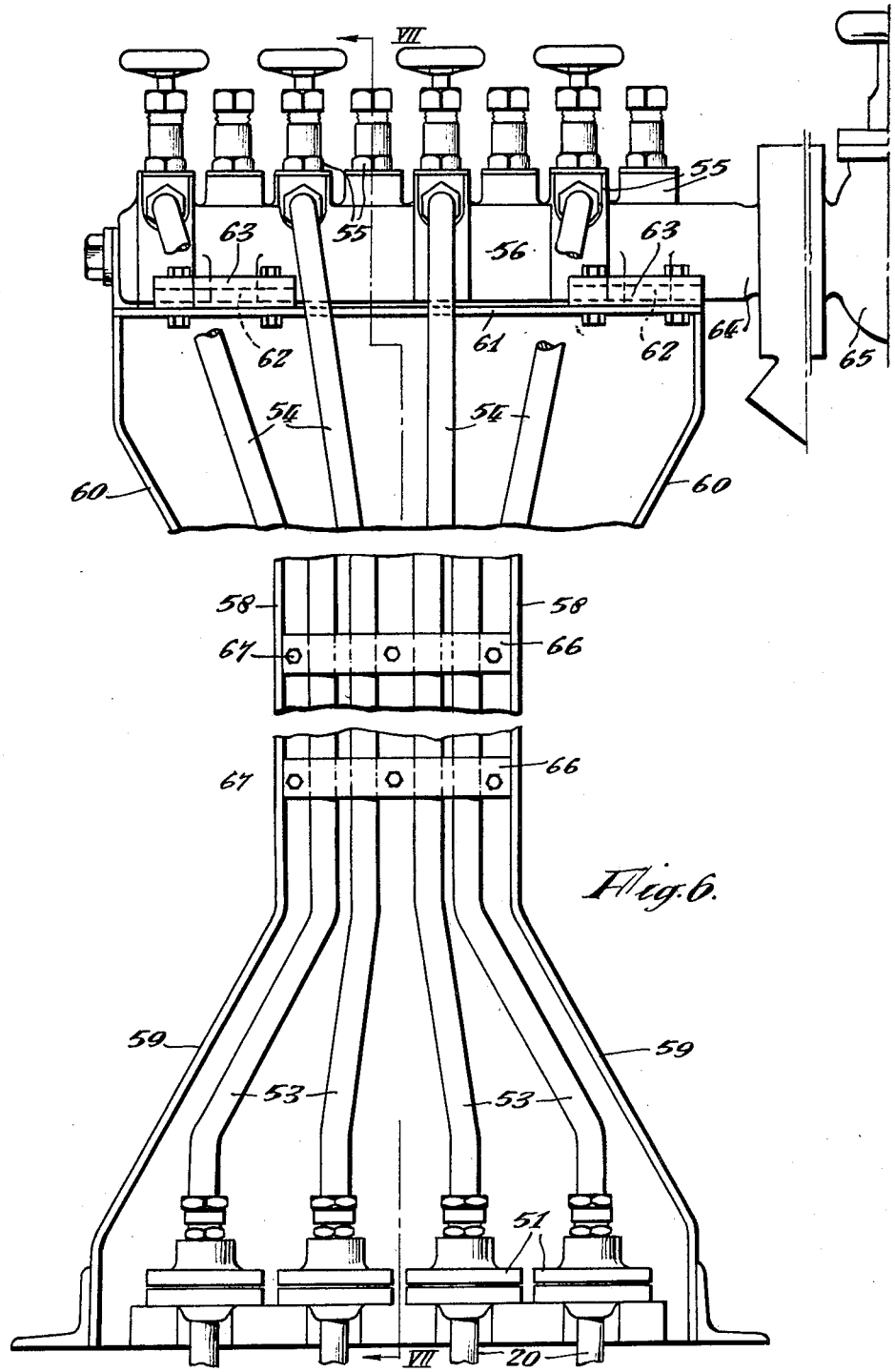

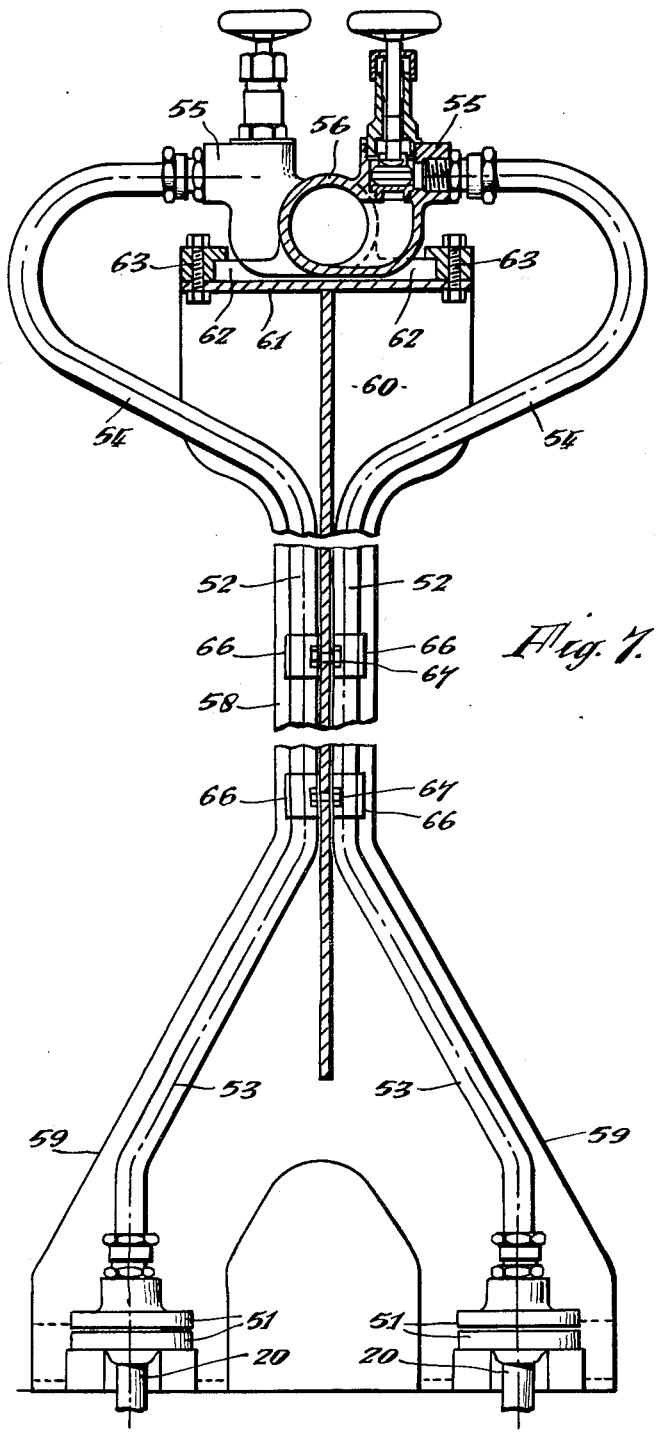

United States Patent Office 3,205,848
Patented Sept. 14, 1965

3,205,848
HEATING APPARATUS FOR LIQUID CARGO TANKS OF SHIPS
Thomas Paul Watson Matthews, Ponteland, Northumberland, England, assignor to Charlton, Weddle & Co. Limited, Newcastle, England, a company of Great Britain and Northern Ireland
Filed Nov. 8, 1962, Ser. No. 236,231
Claims priority, application Great Britain, June 8, 1962, 22,275/62
4 Claims. (Cl. 114—74)

The present invention provides improvements in or modifications of heating apparatus for a liquid cargo tank of a ship, of the kind to which our British Patent No. 897,346 relates, and which comprises a tubular grid supported horizontally adjacent the bottom of the tank with steam supply from and condensate discharge to deck level, characterised in that the grid in each individual tank is divided into at least two sections, each section having at its discharge end a condensate lift, and a separate riser pipe from each condensate lift extending to deck level whereat each riser pipe is connected through a separate steam trap to an exhaust main.

According to the present invention we now provide heating apparatus as described and claimed in our aforesaid British Patent No. 897,346, improved or modified in that each section of the tubular grid has connected to its inlet end a separate steam supply pipe having a cross-sectional area smaller than that of the grid tubing, and the separate riser pipe from the condensate lift at the discharge end of each section has a bore the cross-sectional area of which is not more than a quarter of that of the grid tubing.

The foregoing and other features of an embodiment of heating apparatus for a transverse group of centre and wing tanks in a ship will be described by way of example with reference to the accompanying diagrammatic drawings, wherein:

FIG. 1 is a transverse section of said group of tanks.
FIG. 2 is a plan of the bottom of the centre tank and one wing tank.
FIG. 3 is a vertical section of a condensate lift,
FIGS. 4 and 5 are an elevation and a vertical section of a detail,
FIGS. 6 and 7 are an elevation and a vertical section of another detail and FIG. 8 is a detail elevation of a connection between a steam supply pipe and a grid tube.

As shown in FIGS. 1 and 2, the entire volume enclosed by the bottom plating 1, side plating 2, deck 3 and two transverse bulkheads 4 of a ship is occupied by a centre tank 5 and a pair of wing tanks 6a, 6b, said tanks being separated by longitudinal bulkheads 7.

Heating apparatus for said tanks, comprising tubular grids, for example of aluminum-bronze tubing of the order of 1½" internal diameter, supported horizontally adjacent the bottoms of the tanks, is divided into four sections 8, 9, 10, 11, two in each half of the centre tank 5, and two sections 12, 13 in the tank 6a and two sections 14, 15 in the tank 6b. Each of the grid sections 8–15 comprises four straight lengths interconnected by U-bends, and extending longitudinally of the ship. The three U-bends in each section are preferably passed through suitable holes in the longitudinal stiffeners 16 of the bottom plating 1, in order to avoid the creation of inverted U-bends which would result from passing the bends over said stiffeners, and would tend to trap condensate in the longitudinal limbs. Each of the grid sections 8–15 is connected at one end to a steam supply branch 17 and at the other end to a condensate lift fitting 18. The steam supply branches 17 extend singly from horizontal portions 19 of eight supply pipes 20 which extend vertically as diagrammatically shown in FIG. 1 adjacent the longitudinal centre girders 21 to the deck 3, above which they are branched from a steam supply main 23 by means shown in FIGS. 4 and 5.

One of the condensate lift fittings 18 is shown in FIG. 3. It comprises a U-section duct 24 having a larger end in the form of an elbow 25 the horizontal portion of which is a socket adapted to receive an end of a pipe 27 constituting one of the heating grid sections. The lower U-bend 28 of the condensate lift is of reduced area and passes below a partition 29 of which the lower end 30 is at a level below the level of the bottom of the tube 27. The rising limb 31 of the passage 24 is upwardly tapered towards a socket end 32 adapted to receive the lower end of relatively small condensate riser pipe 33. For example, the pipe 27 of the heating grid section may have a bore of the order of 1½", while the condensate riser pipe 33 may have a bore of the order of ½", the proportions of the passage 24 in the condensate lift fitting 18 which connects these two pipes being approximately as shown in FIG. 3.

Each of the condensate lift fittings is connected as shown in FIG. 1 to a separate riser pipe by way of a short vertical branch 34 and thence by a horizontal portion 35 to a vertical portion 36 extending adjacent the centre girders 21 up to and through the deck 3.

As shown in FIG. 1, there are eight condensate riser pipes 36, four leading from the condensate lifts 18 of the four sections of heating grid in the centre tanks 5, and two leading from each of the condensate lifts 18 of the heating grid sections in each of the wing tanks 6a and 6b. The eight pipes 36 are disposed adjacent the centre line of the ship, and emerge through the deck in two groups of four in the disposition shown in FIGS. 4 and 5, where there is connected to each of them one of a group of eight branch cocks 37 with plugged outlets. From the mountings 50 of these cocks similar pipes 38 extend upwards in an exhaust unit 68. The pipes 38 are for convenience brought more closely together by convergent oblique portions 39 extending from the mountings 50, and have at their upper ends divergent portions 40 which are connected to a rank of eight steam traps 41 as shown. For the protection of the pipes 38 from damage by the force of sea water washing over the deck 3, these pipes are disposed in a vertical double-sided open tray 42 with flanges 43 extending up the lengths of the lateral margins, the tray 42 and the flanges 43 being as indicated in FIG. 4 upwardly convergent at the lower end where said flanges are broadened as shown in FIG. 5 to provide a pedestal, and divergent at the upper end to embrace the eight pipes 38 and the steam traps 41.

It is preferred to house the pipes 38 in an open tray rather than to endeavour to enclose them and cover them with heat insulating material, since the pipes contain largely water nearly at boiling point and a relatively small proportion of steam (although such steam in total comprises a substantial quantity which is worth recovery with the aid of efficient steam traps); if these pipes are merely wetted with sea water the consequent loss of heat through the pipes is limited to that required to dry their surfaces whereas if they were enclosed and insulated a much greater amount of sea water would be entrapped and heat would be lost from the pipes 38 in evaporating this water.

The steam traps 41 are preferably of the type known as the Spirax Thermodynamic Steam Trap sold by Spirax-Sarco Limited of Cheltenham, England (British Patent No. 755,178). These traps are found to be highly efficient for the operation of heating apparatus according to the present invention.

Further, as shown in FIGS. 4 and 5 the steam traps 41 are connected individually each to a non-return valve 44 of a type capable of being screwed down to be closed when desired, and these valves 44 are in turn connected in groups of four alternately into opposite sides of an auxiliary manifold 45, which is connected by way of a branch 47 to an exhaust main 48. Said main 48 is supported together with the tray 42 upon a longitudinal gantry and walkway 49 such as commonly provided on tanker ships.

The steam supply pipes also extend in a group above deck level, in a similar manner, to provide a control unit 69 as illustrated in FIGS. 6 and 7. The eight pipes 20, like the riser pipes 36, pass through the deck in two groups of four and are connected by flange unisons 51 to eight pipes 52 which are brought more closely together by convergent, oblique lower portions 53. At their upper ends the pipes 52 have divergent and curved portions 54 which are brought horizontally into two groups of stop valves 55, provided alternately on opposite sides of a manifold 56 with which the bodies of said valves are integrally cast. The pipes 52 are mounted in and protected by a vertical double-sided open tray comprising a flat plate 57 with flanges 58 extending up the length of the lateral margins. The lower ends 59 of the flanges 58 are broadened as shown in FIG. 7 and made divergent as shown in FIG. 6, to provide a pedestal in the form of a pyramid which serves as a suitable support for the control unit. Further, the upper parts 60 of said flanges are broadened as shown in FIG. 7 and made divergent as shown in FIG. 6, and are connected by a horizontal plate 61 which serves as a mounting for the manifold 56. The latter is formed with two pairs of laterally extending feet 62 which are engaged by two pairs of guide members 63, having the section shown in FIG. 7, and bolted to the plate 61 so that the manifold 56 is slidable to a limited extent in the direction of its axis, and substantially perpendicularly to the upper ends 54 of the supply pipes, to allow for contraction and expansion of a steam main (not shown) to which the manifold 56 is connected by way of a steam strainer 64 and a main stop valve 65. In order to permit the pipes 52 and their upper portions 54 to flex under such movement of the manifold 56, the pipes 52 are secured to the supporting plate 57 only towards their lower ends by two pairs of saddle members 66, which are secured together on opposite sides of the plate 57, each pair by a set of three bolts 67 as shown.

An advantage of heating apparatus according to the present invention (with the provision of the heating grids 8–15 in at least two sections in each tank, and every section having its terminal condensate lift 18 connected by a separate small diameter riser pipe directly up to and through the deck, and then by means as shown in FIGS. 4 and 5 above the deck individually into the exhaust main, according to our British Patent No. 897,346) is a further provision of separate steam supply pipes, one for each section of the heating grid, by way of a control unit as shown in FIGS. 6 and 7, each of the steam supply pipes being of relatively small cross-sectional area compared with the area of the tubing of the grid, and each of said supply pipes being provided with a separate inlet valve 55 of corresponding size. This arrangement of relatively small pipes, which may for example have a bore of the order of ¾", has the advantage that steam from the main is distributed to the several sections of the heating grid substantially equally without the need for accurate adjustment of the inlet valves 55, so that in combination with the condensate lifts and the small riser pipes the grid utilises for heating of the liquid cargo the sensible heat of the steam and the latent heat of condensation in such manner that while the greater part of the steam is condensed and the discharge consists mainly of water nearly at boiling point, the condensation does not occur at any substantial distance from the discharge end of any one section. Thus, the heating of the liquid cargo is effected under better conditions of heat transfer than has been obtained in heating systems available prior to the date of the said British Patent No. 897,346, in that no substantial part of any section of the heating coils operates by liquid-liquid heat transfer. Furthermore, by provision of individual inlet valves and supply pipes to each section of the grid, in the event of a leak occurring in any one section, that section can be cut out of the steam circuit. This is important not only from the possibility of steam leaking into the cargo, but from the fact that the cargo is usually oil and it is essential that there shall be no oil in the condensate. Further, the system allows for the efficient recovery of hot condensate by way of grid sections.

The efficiency of heating apparatus thus arranged depends on various factors, primarily upon the means whereby steam is effectively distributed to the grid sections and condensate is rapidly and effectively removed from the grid sections and lifted with the minimum obstruction up to deck level and into the exhaust main, by the provision of steam supply pipes having a bore smaller than that of the grid tubing and riser pipes having a still smaller bore. The fact that the condensate from each grid section is taken as far as the auxiliary manifold 45 separately from the condensate formed in every other section contributes notably to the minimisation of obstruction. An important factor in promoting the efficiency is the steam trap, and the Spirax trap as above referred to is found to be highly efficient for this purpose. Another contributory factor is the form of condensate lift fitting 18 as shown in FIG. 3, which is highly effective to collect the condensate from each of the grid sections and to cause this condensate to be ejected and lifted up the small diameter riser pipe as a virtually continuous column of water by residual steam reaching the end of each grid section.

As a result of the efficiency of the heating system resulting from these factors it is found that, as hereinbefore mentioned, the hitherto employed high ratio of heating surface to tank capacity can be considerably reduced, even to the extent of about 50%. It is thus possible, while still using the commonly employed dry saturated steam at a pressure of 100–120 lbs. per square inch, on substantially increasing the rate of circulation, to reduce the diameter of the pipes 27, constituting the heating grid sections 8–15, as compared with the pipes of heating grids hitherto employed. Thus, as above mentioned, the heating grid pipes may have a bore of the order of 1½" while the steam supply pipes have a bore of about ¾" and the riser pipes may be no bigger than ½" bore, or otherwise with cross-section areas in the proportions of about 9:36:4, with the valves 55 and 44 and the steam traps 41 of corresponding size.

What I claim and desire to secure by Letter Patent is:

1. In a ship having liquid cargo tanks in transverse groups each of at least one centre tank between two wing tanks, heating apparatus of the kind comprising a grid of tubing supported horizontally adjacent the bottom of each tank with means for steam supply from above deck level and means for condensate discharge to deck level, and wherein the grid in each individual tank is divided into at least two sections, each section having at its discharge end a condensate lift, and a separate riser pipe having a smaller bore than that of said grid tubing extended from each condensate lift to and through the deck above which each riser pipe is connected through an individual steam trap to an exhaust main, further comprising in combination a separate steam supply pipe connected to the inlet end of each section of the tubular grid, said steam supply pipes each having a cross-sectional area smaller than that of the grid tubing, the steam supply pipes to the grid sections in a transverse group of tanks being grouped and supported together above deck level, and each supply pipe being connected by a separate stop-valve to a steam supply manifold.

2. Heating apparatus according to claim 1, wherein said manifold is mounted to be slidable to a limited extent in the direction of its axis and substantially perpendicularly to the upper ends of said supply pipes, to accommodate contraction and expansion of the steam main to which the manifold is connected.

3. Heating apparatus according to claim 1, wherein the portions of the group of steam supply pipes extending upwards from deck level are protected by an open tray-like support.

4. Heating apparatus according to claim 3, wherein said support is double-sided, comprising a flat plate with flanges at its lateral edges, and the steam supply pipes are disposed alternately on opposite sides of said plate with their stop-valves on opposite sides of said manifold.

References Cited by the Examiner

UNITED STATES PATENTS 1,265,387  5/18  Robson _____ 165—101

FOREIGN PATENTS 897,346  5/62  Great Britain.

JAMES W. WESTHAVER, *Primary Examiner*.